Oct. 19, 1926.
H. D. PARK
1,604,070
MOWER ATTACHMENT
Filed Jan. 2, 1925   2 Sheets-Sheet 1
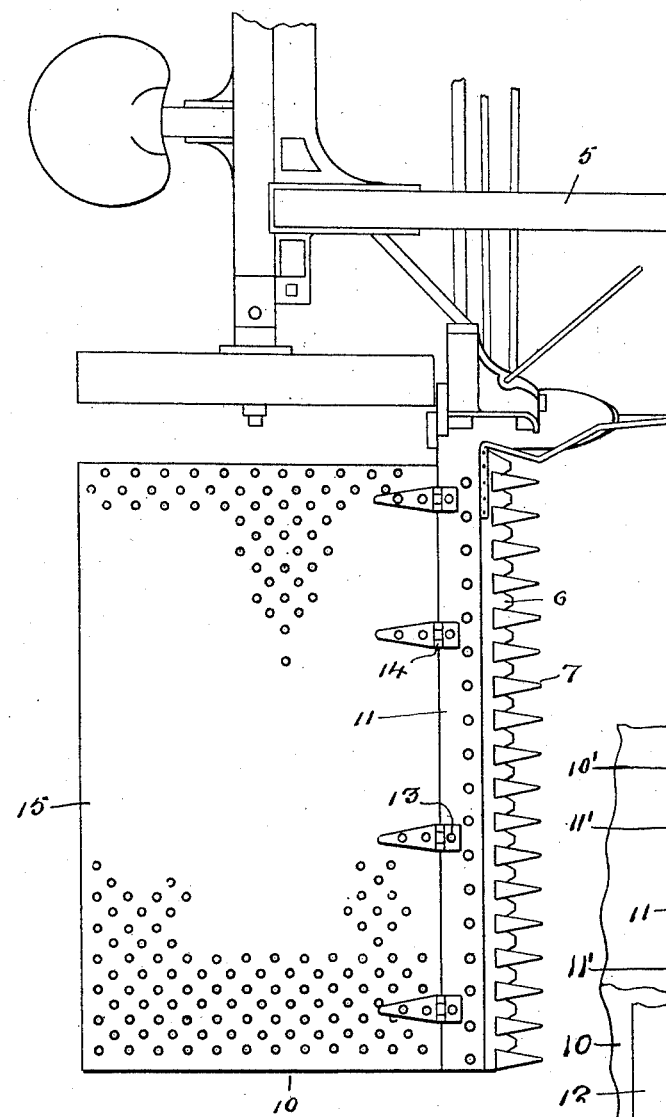
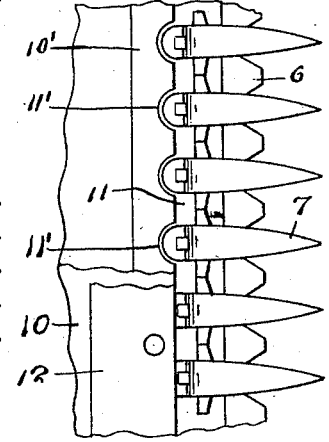

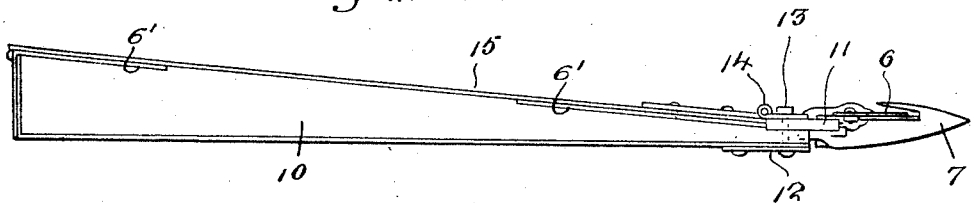
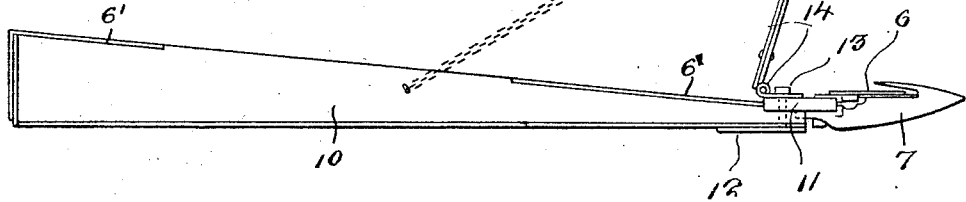
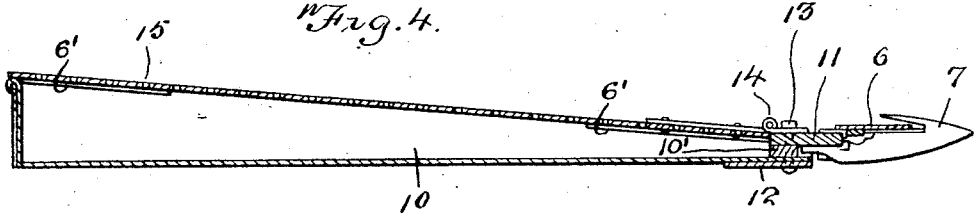

Patented Oct. 19, 1926.

1,604,070

UNITED STATES PATENT OFFICE.

HENRY D. PARK, OF CALHOUN CITY, MISSISSIPPI.

MOWER ATTACHMENT.

Application filed January 2, 1925. Serial No. 193.

My invention relates to an attachment for mowers and its principal object is to provide a receptacle or pan to be associated with the sickle rod of a mower and arranged to catch and retain grain and grass seed as the stalks are being severed.

A further object of the invention is to provide an attachment for a mower that is adapted to be secured to the finger bar thereof and which embodies a receptacle which is movable along the ground and arranged to catch some of the falling seed of grain or grass which usually falls upon the ground as the stalks are being severed.

Another object of the invention is to provide an attachment of this character which can be associated with any sickle bar guard without changing the construction thereof and which will effectively collect grain or seed as the stalks are being cut.

With the preceding and other objects and advantages in mind, the invention consists in the novel combination of elements, construction and operations to be hereinafter more fully described, illustrated in the accompanying drawings, and pointed out in the appended claim.

In the drawings:—

Figure 1 is a fragmentary top plan view of a mowing machine having my attachment associated therewith.

Figure 2 is an end elevation of the attachment associated with the cutter bar guard of the mowing machine.

Figure 3 is a similar view showing the device with its cover arranged in open position.

Figure 4 is a longitudinal sectional view of the attachment and mowing machine part.

Figure 5 is a fragmentary elevation illustrating the manner of connecting the attachment to the cutter bar guard.

Referring to the drawings in detail wherein corresponding characters of reference denote corresponding parts throughout the several views, the numeral 5 designates the usual mowing machine including a cutter bar 6 and its guard fingers 7, attached to the finger bar 11.

My invention comprises a pan or receptacle indicated at 10. The side walls are suitably braced and reinforced by strips 6' as clearly shown in Figures 2, 3 and 4 of the drawings. This pan is relatively shallow and has its side walls decreasing in height towards its forward end. As shown in Figure 4 the forward end of the pan 10 is open to receive the finger bar of the mower. A longitudinal wear plate 12 is disposed upon the under face or bottom of the pan 10 at its forward edge and passing through this plate, bottom of the pan 10, bar 11 and spacing strip 10' is a plurality of fastening elements 13. These fastening elements 13 also extend through hinges 14. A perforated cover 15 is provided for the pan 10 and has its forward edge connected with the hinges 14 as shown. The spacing strip 10' is formed from wood and as shown is fixed directly to and below the longitudinal bar and is formed with parallel longitudinally disposed substantially semi-circular recesses 11' to accommodate the inner or rear ends of the guard fingers.

Normally, this cover 15 rests upon the upper edges of the side walls of the pan 10 and assumes an angular position so that any seed may fall thereon and gravitate through the openings in the cover. In order to limit the opening of the cover 15 and to hold the same in such open position, a chain or other flexible element 16 is attached to the cover intermediate its ends and has its opposite end connected to one of the side walls of the pan. In the operation of the device the cutter bar travels over the field being cut in the usual manner to sever the stalks of grain or the like. Incident to this operation, a certain amount of the seed fall to the ground and are consequently wasted. With my invention these seeds fall upon the perforated cover 15 and graviate into the pan 10 from which they can be removed after the pan has become filled.

While I have shown and described the preferred embodiment of the invention, I desire to have it understood that such changes may be made in the form, construction and arrangement of parts, as will not depart from the spirit of the invention or the scope of the subjoined claim.

What is claimed is:—

In a seed attachment for mowers having a longitudinal bar and guard fingers for the cutter bar thereof, said guard fingers being secured to the longitudinal bar, a strip longitudinally underlying and secured to the longitudinal bar and having one edge portion thereof formed to accommodate the rear portions of the guard fingers, a seed pan having a closed rear wall and tapered side walls which decrease in height toward the front ends thereof, a bottom for the pan and being secured to the side walls, a wear plate secured to the forward end of the under face of the bottom, a perforated top disposed in a manner to follow the inclination of the side walls, hinge means for said top for securing the same to the longitudinal bar and bolts passing through the hinge means, longitudinal bar, strip, forward end portion of the bottom wall and wear plate respectively all of which are disposed in superimposed relation.

In testimony whereof I affix my signature.

HENRY D. PARK.